Figure 1:
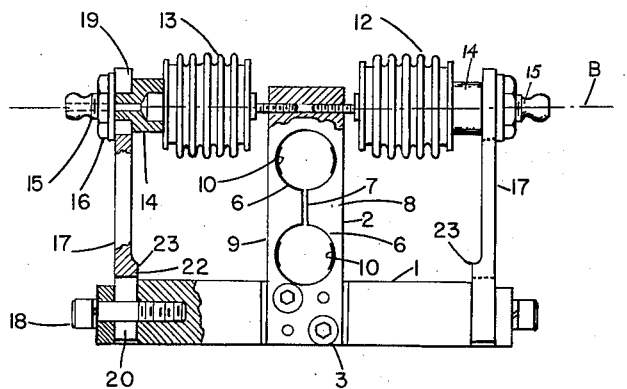

Jan. 12, 1960   M. GREEN   2,920,487
FLUID PRESSURE MEASURING DEVICE
Filed Feb. 6, 1958

INVENTOR
MALCOM GREEN
Edward C. Hathaway
ATTORNEY

United States Patent Office 2,920,487
Patented Jan. 12, 1960

2,920,487
FLUID PRESSURE MEASURING DEVICE

Malcolm Green, Waban, Mass., assignor to Baldwin-Lima-Hamilton Corporation, a corporation of Pennsylvania Application February 6, 1958, Serial No. 713,691

6 Claims. (Cl. 73—407)

This invention relates to fluid pressure measuring cells or transducers of the electrically responsive type.

Fluid pressure measuring cells are used for measuring either single or differential pressures. In pressure cells, of the general type disclosed herein, a single pressure type employs only one pressure responsive expansible element which actuates a force responsive device for producing an electrical output proportional to the pressure. In a differential pressure cell, two of such pressure responsive elements are arranged in opposed relation so that the net difference between two pressures is effective in actuating the force responsive device whereby the electrical output is a measure of the differential pressure. One of the problems in connection with each of these types of cells is to adjust their sensitivity or span, which is the change in electrical output for a full scale pressure. There is the additional problem in connection with differential cells of having the opposed pressure expansible elements act in an accurately matched manner. The difficulty of obtaining matched action arises from the fact that pressure expansible elements seldom have the same effective area and hence it is necessary to compensate for the inequality of effective areas where a high degree of accuracy is desired. These pressure expansible elements may take any one of well-known forms such as metallic or plastic bellows, or diaphragms and piston and cylinder elements relatively biased by a spring similar to the spring action that is inherent in a bellows, i.e., in a collapsing direction if expanded by pressure, or in an expanding direction if collapsed by vacuum. Prior attempts to solve the above and other problems have involved certain complications and difficulties either structurally or functionally.

It is an object of my invention to provide an improved fluid pressure measuring device that is relatively simple in construction and operation for adjusting the span and at the same time obtaining a high degree of accuracy combined with ruggedness, compactness and economy of manufacture.

A further object is to provide an improved differential fluid pressure measuring cell in which differences in the effective areas of opposed expansible elements may be compensated in a relatively simple manner while maintaining a high degree of accuracy and desired sensitivity together with providing a construction that is rugged and compact.

Figure 2:
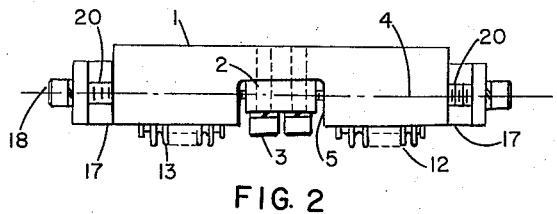
Figure 3:
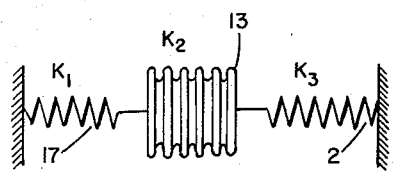
Figure 4:
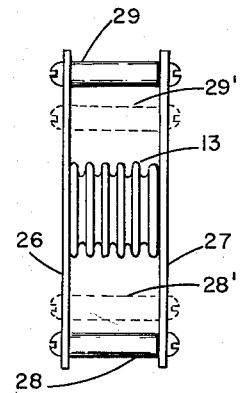

Other objects and advantages will be more apparent to those skilled in the art from the following description and accompanying drawings in which:

Fig. 1 is a side elevation of my improved pressure cell;
Fig. 2 is a bottom plan view of Fig. 1;
Fig. 3 diagrammatically illustrates the principles by which I accomplish my improved adjustment of the span as well as compensating for different effective areas of the expansible elements in a differential cell; and
Fig. 4 is a diagrammatic illustration of how the stiffness of a bellows may be varied.

I have shown my invention as specifically applied to a differential type cell because this type illustrates my improved principles not only in compensating for different effective areas of the expansible elements but also in adjusting the span of both single and differential pressure cells. However, Fig. 3 may be taken as a diagrammatic disclosure of a single cell although it illustrates the principles of my invention as applied to both types.

As shown in Fig. 1, I provide a base 1 having a force sensing strain responsive cantilever beam 2, preferably, but not necessarily, of spring-like characteristics. This beam is secured at its lower end to base 1 by screws 3. In order to position the beam 2 on a given center line 4, Fig. 2, the base is recessed at 5 to receive the beam. The beam is preferably of the twin-beam type formed for instance by providing two holes 6 in a solid member and connected by a slot 7 thereby creating parallel beams 8 and 9 which are rigidly connected together at each of their ends. The force acting on the free end of the beam can be measured by any suitable means, specifically shown herein as electrical strain gages 10 of the well-known bonded filament type bonded to the inner surfaces of the holes 6 at points adjacent the outer surface of the cantilever beam. The gages, as is well known, are connected into a Wheatstone bridge to measure the gage output. The twin-type beam is particularly advantageous in my improved cell because the beam is relatively stiff for a given output, and hence has minimum deflection for a given fluid pressure, and also its upper end remains horizontal during movement rather than incline at an angle as is the case with a single beam swinging on an arc.

The fluid pressure expansible elements 12 and 13, preferably in the form of bellows, have their inner ends rigidly connected to the free end of the beam 2 and preferably, but not necessarily, in axial alignment with each other so that in effect the inner ends of the bellows are commonly rigidly connected together. The outer ends of the bellows are provided with any suitable studs 14 having reduced threaded ends 15 to be clamped by nuts 16 onto the upper end of supporting beams 17 which have limited, but adjustable, flexibility. The lower end of these supporting beams are connected to base 1 by suitable screws 18. It will be noted that both ends of the supporting beams have vertical slots 19 and 20 through which the threaded studs 15 and screws 18 extend. The term "vertical" as used herein is a relative term inasmuch as this device may assume any desired position. The supporting beams and the connections of the bellows and base thereto are identical for each beam and hence the description for one suffices for both. It will be noted that the lower ends 22 of the supporting beams are thicker than the upwardly extending flexible portion thereof. Hence, with base and bellows remaining stationary, by adjusting the vertical position of these supporting beams relative thereto as by moving the supporting beams upwardly or downwardly by reason of their slots 19 and 20, the active bending length of such beam is increased or decreased without changing the line of action of the bellows. The active length of the bending beam for any given position thereof is the distance between the shoulder 23 of the supporting beam and the point at which the nut 16 clamps the supporting beam against the bellows base 14.

The reduced thickness of the supporting beams 17 is such as to give these beams a predetermined flexibility or spring rate that varies according to the active length of the beam and it is the utilization of this spring rate in combination with the spring rate of the bellows and force sensing beam that allows adjustment of not only the span for either single or differential pressure cells but also compensates for differences in effective areas of the opposed bellows in a differential cell. The bellows 1a and 13 expand and contract along an axis B in response to increase and decrease of pressure and have spring-like action which urges them to return to a neutral position whenever they are expanded or contracted by pressure.

In explanation of the principles of operation of my device whereby the adjustability of the active bending length of the beam 17 permits bellows of different effective areas to be compensated, I will first consider the action of Fig. 1 with the element 12 removed, resulting in a single pressure cell responsive to the pressure acting on bellows 13. This single cell can have its bellows 13, supporting arm 17, and sensing beam 2 illustrated in the form of springs as shown in Fig. 3. For instance, the stiffnesses of the three spring-like elements can be designated as $K_2$, $K_1$, and $K_3$ respectively.

There is a pressure P acting inside the bellows 13 which has an effective area A. Then it can be shown that the force that will act upon the force sensing element 2 is $$\text{Force} = \frac{K_1}{\frac{K_1 K_2}{K_3} + K_1 + K_2} PA = \frac{1}{\frac{K_2}{K_3} + 1 + \frac{K_2}{K_1}} PA \quad (1)$$

Furthermore, if we assume $K_3 = $ infinity, this simplifies to $$F = \frac{K_1}{K_1 + K_2} PA = \frac{1}{1 + \frac{K_2}{K_1}} PA \quad (2)$$

which is seen to mean that by predetermining the relative magnitudes of stiffnesses $K_1$ and $K_2$ we can vary the amount of force sensed and hence the output for a given pressure.

It is seen that as $$\frac{K_2}{K_1}$$

approaches infinity the force sensed approaches zero and as $$\frac{K_2}{K_1}$$

approaches zero the force sensed approaches simply the limit PA. Anywhere in between is subject to choice of $$\frac{K_2}{K_1}$$

i.e., the relative stiffness.

If $K_3$ in (1) is not sensibly infinite relative to $K_1 + K_2$ the range of adjustment is affected by the presence of the term $$\frac{K_2}{K_3}$$

but the principle is unchanged. As a practical matter, the ratio $$\frac{K_2}{K_3}$$

is preferably made small enough that the simpler Equation 2 is a close approximation to the facts.

By adjusting the vertical position of one or the other of the supporting beams 17 in differential cell so that their active bending lengths are adjusted it is possible to compensate for differences in the effective areas of the two bellows 12 and 13 whereby their effective forces acting on the sensing beam are brought into equality for a given pressure, even though the axes of these bellows and their connection to the sensing beam 2 remains fixed at all times. It will be understood from the disclosure of the principles herein that the supporting beams 17 are sufficiently heavy so as to provide substantial supports for the bellows and to resist the pressures therein and yet are capable of having the necessary small amount of flexibility compared to that of sensing beam 2. As a further result the entire device is extremely rugged while still being capable of a high degree of sensitivity and accuracy together with ease of adjustment to compensate for any differences in effective areas of the bellows.

In the preferred embodiment I accomplish adjustment of the span or sensitivity in the single cell by merely changing the effective bending length of its single supporting member 17, or in the differential cell by changing the lengths of both supporting arms 17, it being understood that the arms 17 are so relatively adjusted as to compensate for differences in the effective areas of the bellows.

The relative stiffness of the bellows and arms 17 can also be varied by selection of either or both of these elements or, preferably, by providing some means of adjusting the stiffness of the bellows such, for example, as shown in Fig. 4. Here, two spring straps 26, 27 are attached to the ends of the bellows 13 and provided with spacer means 28 and 29 which may be adjusted lengthwise of the straps, for example, to positions 28' and 29' to vary the overall stiffness of the pressure responsive means or element which includes the straps and spacer. It will be understood that, as usual, the inner end of the bellows is closed and the outer end is open for suitable connection to a source of fluid pressure to be measured such as through a passageway in the threaded studs 15.

From the foregoing disclosure it is seen that I have provided an improved combination whereby unequal effective areas of opposed pressure expansible elements may be compensated for in an extremely simple manner while at the same time providing a high degree of ruggedness and compactness together with accuracy and desired sensitivity as well as adjusting the span.

It will, of course, be understood that various changes in details of construction and arrangement of parts may be made by those skilled in the art without departing from the spirit of the invention as set forth in the appended claims.

I claim:

1. A fluid pressure measuring device comprising, in combination, a fluid pressure responsive element that expands and contracts along a given axis in response to increase and decrease of pressure and has a spring-like action that urges the element to return to a neutral position whenever the element expands or contracts by pressure, a force sensing element connected to one end of said responsive element so as to be responsive to a force from said element acting in the direction of said axis, supporting means having a spring-like action connected to the other end of the pressure responsive element for resisting movement thereof in the direction of said axis, whereby the relative stiffnesses of said spring-like actions of the responsive means and of the supporting means determines the magnitude of force exerted by the pressure responsive element on the force sensing element for a given pressure, and means for adjusting the relative spring stiffnesses between the pressure responsive element and the spring-like support therefor, thereby to control the relationship between the fluid pressure and the force transmitted to the force responsive element.

2. A fluid pressure measuring device comprising, in combination, a fluid pressure responsive element that expands and contracts along a given axis in response to increase and decrease of pressure and has a spring-like action that urges the element to return to a neutral position whenever the element expands or contracts by pressure, a force sensing element connected to one end of said responsive element so as to be responsive to a force from said element acting in the direction of said axis, supporting means having a spring-like action connected to the other end of the pressure responsive element for resisting movement thereof in the direction of said axis, whereby the relative stiffnesses of said spring-like actions of the responsive means and of the supporting means determines the magnitude of force exerted by the pressure responsive element on the force sensing element for a given pressure, said supporting means including a cantilever beam having a spring-like action and whose free end is connected to said other end of the pressure responsive element, and means for varying the spring-like action of said beam.

3. A fluid pressure measuring device comprising, in combination, a fluid pressure responsive element that expands and contracts along a given axis in response to increase and decrease of pressure and has a spring-like action that urges the element to return to a neutral position whenever the element expands or contracts by pressure, a force sensing element connected to one end of said responsive element so as to be responsive to a force from said element acting in the direction of said axis, supporting means having a spring-like action connected to the other end of the pressure responsive element for resisting movement thereof in the direction of said axis, the relative stiffnesses of said spring-like actions of the responsive means and of the supporting means determines the magnitude of force exerted by the pressure responsive element on the force sensing element for a given pressure, said supporting means including a cantilever beam having a spring-like action, a base for supporting one end of the cantilever beam in a fixed position and the other end of the beam being free and connected to said other end of the pressure responsive element to move therewith, the end of the cantilever beam that is fixed to the base being relatively thick compared to the remaining length of the beam, and means for adjusting the cantilever beam in the direction of its lengthwise axis while maintaining the axis of the pressure responsive element a constant distance from said base thereby to vary the effective bending length of the beam and accordingly vary the stiffness of said spring-like action of the cantilever beam.

4. A fluid pressure measuring device comprising, in combination, a fluid pressure responsive element that expands and contracts along a given axis in response to increase and decrease of pressure and has a spring-like action that urges the element to return to a neutral position whenever the element expands or contracts by pressure, a force sensing element connected to one end of said responsive element so as to be responsive to a force from said element acting in the direction of said axis, supporting means having a spring-like action connected to the other end of the pressure responsive element for resisting movement thereof in the direction of said axis, whereby the relative stiffnesses of said spring-like actions of the responsive means and of the supporting means determines the magnitude of force exerted by the pressure responsive element on the force sensing element for a given pressure, said supporting means including a cantilever beam having a spring-like action, a base for supporting one end of the cantilever beam in a fixed position and the other end of the beam being free and connected to said other end of the pressure responsive element to move therewith, the end of the cantilever beam that is fixed to the base being relatively thick compared to the remaining length of the beam, said beam having slots at its upper and lower ends extending in the direction of the lengthwise axis of the beam, and fastening means extending through said slots for securing the thicker end of the beam to said base and the thinner end of the beam to the pressure responsive element, whereby upon loosening said fastening means said cantilever beam may be shifted in the direction of its lengthwise axis so as to change the location of the fastening means within the slotted ends thereby to vary the stiffness of said spring-like action.

5. A fluid pressure measuring device comprising, in combination, a fluid pressure responsive element that expands and contracts along a given axis in response to increase and decrease of pressure and has a spring-like action that urges the element to return to a neutral position whenever the element expands or contracts by pressure, a force sensing element connected to one end of said responsive element so as to be responsive to a force from said element acting in the direction of said axis, supporting means having a spring-like action connected to the other end of the pressure responsive element for resisting movement thereof in the direction of said axis, whereby the relative stiffnesses of said spring-like actions of the responsive means and of the supporting means determines the magnitude of force exerted by the pressure responsive element on the force sensing element for a given pressure, a second pressure responsive element positioned in opposed relation to the first pressure responsive element and connected at one end to the force sensing element, means for supporting the other end of the second pressure responsive element to resist movement thereof in the direction of said axis, and means for relatively adjusting the spring-like actions of the first responsive means and the support therefor whereby any differences in effective areas of the pressure responsive elements may be compensated so as to cause the pressure responsive elements to exert equal and opposite forces on the force sensing element when the two pressure responsive elements are subjected to the same pressure.

6. A fluid pressure measuring device comprising, in combination, a fluid pressure responsive element that expands and contracts along a given axis in response to increase and decrease of pressure and has a spring-like action that urges the element to return to a neutral position whenever the element expands or contracts by pressure, a force sensing element connected to one end of said responsive element so as to be responsive to a force from said element acting in the direction of said axis, supporting means having a spring-like action connected to the other end of the pressure responsive element for resisting movement thereof in the direction of said axis, whereby the relative stiffnesses of said spring-like actions of the responsive means and of the supporting means determines the magnitude of force exerted by the pressure responsive element on the force sensing element for a given pressure, a second pressure responsive element positioned in opposed relation to the first pressure responsive element and is connected at one end to the force sensing element, means for supporting the other end of the second pressure responsive element to resist movement thereof in the direction of said axis, means for relatively adjusting the spring-like actions of the first responsive means and the spring-like support therefor whereby any differences in effective areas of the pressure responsive elements may be compensated so as to cause the pressure responsive elements to exert equal and opposite forces on the force sensing element when the two pressure responsive elements are subjected to the same pressure, said second support means also having a spring-like action in the direction of said axis, and means for relatively adjusting the spring-like actions of the second responsive means and the second support.

References Cited in the file of this patent
UNITED STATES PATENTS

| | | |
|---|---|---|
| 2,079,069 | Johnson | May 4, 1937 |
| 2,124,072 | Luckey et al. | July 19, 1938 |
| 2,593,169 | Moore | Apr. 15, 1952 |
| 2,772,569 | Ruge | Dec. 4, 1956 |